Patented Feb. 15, 1949

2,461,921

UNITED STATES PATENT OFFICE 2,461,921

ANTISPASMODIC COMPOSITION

Harold M. Rabinowitz, Brooklyn, N. Y.

No Drawing. Application June 15, 1945,
Serial No. 599,772

3 Claims. (Cl. 167—74.5)

This invention relates to an antispasmodic composition and the method of making it.

Because of the prevalance of involuntary contractions of muscles causing what is known as spasms, there has long been need of a satisfactory antispasmodic medicinal. To provide such a material is an object of this invention.

Briefly stated, the invention comprises the herein described method of making from urine of a liver-bearing animal a compound that is soluble in alcohol and in water, slightly but appreciably soluble in ethyl acetate, insoluble in chloroform, in ether, and in acetone, is crystalline, optically active so as to rotate the plane of polarized light, and of melting point about 123-4° C. The invention comprises also the antispasmodic composition including the compound prepared as described.

The composition so made has been found to be useful in the relief of spasmogenic aptitudes, including spasms of the extra-hepatic ducts (dyskinesia), spasm of pylorus, spasm of colon, spasm of cardiac end of stomach, bronchial spasm, spasm of a blood vessel in the region of an obstructing embolus or thrombus, localized spasm of blood vessels (Raynaud's Disease), and spasm of muscles of the legs better known as claudication.

The dosage is ordinarily 0.5 to 1.5 mg. in 1 cc. of physiologic saline solution, the treatment being given hypodermically once or twice a week.

Scores of human patients having spasmogenic aptitudes have been treated with satisfactory results, by intramuscular or intravenous injections given once or twice a week, usually for a total period of 1 to 5 weeks. It is to be understood, however, that the medicinal herein described is to be administered only by a surgeon or a physician.

In general, the method of making the antispasmodic composition of the present invention comprises separating and discarding the fat from the urine of a liver-bearing animal, as by extraction with a solvent for the fat, evaporating the defatted urine nearly to dryness or to a semi-fluid mass, extracting the resulting mass with an organic solvent such as ethyl acetate, removing the solvent from the non-volatile materials so extracted, dissolving the residue so obtained in a mixture of an alcohol and a water-insoluble organic liquid, such as chloroform, then adding water so as to form two layers, one containing as the solvent most of the alcohol and water and the other the water-insoluble organic liquid, separating the resulting layers or phases from each other, and then treating the alcohol and water fraction to separate therefrom a material which is retainable in adsorbed form by activated alumina and has the solubility, crystal struture, and other properties of the antispasmodic compound refered to above.

The invention will be illustrated in greater detail by description in connection with the following specific example of the preferred method of making the antispasmodic composition.

Five gallons of horse urine are mixed thoroughly with 3 gallons of dibutyl ether, the mixing being continued for several hours. The mixture is then allowed to stand overnight so that two layers are formed. The upper layer, which includes the butyl ether and fat which has been extracted from the urine, is discarded.

The lower layer of defatted urine is withdrawn and evaporated slowly at a temperature of about 170° F. or lower, suitably in vacuo, to about one-third of the original volume. Acetic acid is added at this stage in amount to make the whole slightly acidic. Evaporation is then continued until the material is a concentrated and preferably semi-fluid mass, ordinarily of black color.

This concentrated material is stirred up thoroughly with ethyl acetate, suitably added in portions until ethyl acetate extractable material is practically eliminated from the mass. The various extractions are filtered and evaporated to dryness on the steam bath.

The resulting dried material, usually brown in color, is then dissolved in a mixture of equal parts of 95% alcohol and chloroform used in just sufficient proportions to dissolve the alcohol and chloroform-soluble material present. The resulting solution is then filtered. To the filtrate there is added an equal volume of distilled water, which is stirred into the filtrate thoroughly. This gives two phases. The two phases are then allowed to separate upon standing, the result being an upper layer containing most of the water and alcohol and material preferentially soluble therein and a lower chloroform layer.

The chloroform layer is separated as by being drawn off from the bottom of the container. The remaining upper layer is thoroughly extracted by agitation with successive portions of additional chloroform, the two layers allowed to separate as before and the chloroform layer discarded after each treatment.

The thus extracted water and alcohol fraction is decolorized by treatment with activated decolorizing carbon. The carbon is thoroughly mixed in, allowed to stand overnight and the liquid filtered from the carbon, the filtration being repeated or supplemented by centrifuging if required to effect satisfactory removal of fine particles of carbon.

The decolorized alcohol and water fraction is then evaporated on a water bath to concentrated condition, suitably to the consistency of a viscous mass. This ordinarily is honey colored and transparent.

The concentrated material so obtained is washed with equal parts of a mixture of ether and acetone to remove material soluble in such mixtures.

The remaining ether-acetone washed material is then dissolved in ethyl acetate, the solution filtered if not clear, and the clear solution is poured over heat-activated powdered or slightly granular alumina supported upon a suitable porous material, such as filter paper in a funnel. The activated alumina is a regular article of commerce and is available from scientific supply houses. It retains or adsorbs, in my use, the antispasmodic material present in the ethyl acetate solution poured over the alumina. In case the filtrate issues from the alumina with appreciable color, the filtrate is poured again over the alumina and the process is repeated until the filtrate emerges in practically colorless condition.

The alumina and retained antispasmodic substance is dried, suitably in air at ordinary temperature. The dried material is then washed with a mixture of equal parts of ether and acetone until substantially no additional material is dissolved.

The alumina and retained antispasmodic substances are again caused to dry in air and are then treated with ethyl acetate, this treatment being effected by percolating the ethyl acetate through the alumina and through a supporting filter paper or the like. The percolation is continued until substantially no more material is dissolved by the ethyl acetate passing through the alumina.

The ethyl acetate solution so obtained is then evaporated on a water bath. This leaves a white, crystalline material.

The crystals so obtained melt at 123° to 124° C. Repeated recrystallization does not change the melting point.

The crystals are soluble in alcohol and water, slightly soluble in ethyl acetate and insoluble in chloroform, ether and acetone. The crystals are elongated, ordinarily needles or thickened more or less columnar shapes. The crystals are sometimes aggregated into sheath or fish bone patterns. They are optically active, that is, they rotate the plane of polarized light.

Variations that will occur to one skilled in the art of medicinal preparations may be made on the procedure described.

Thus, there may be used as the urine that of any liver-bearing animal, as, for example, that of an animal that secretes bile, such animals having substantial size which favors liberal production of urine.

The acetic acid used, in the acidification stage during the evaporation of the defatted urine, increases the amount of urobilinogen concentrate separated later as an undesired by-product or impurity. This acid may be replaced by other weak acid, as, for instance, formic acid or propionic acid. Less turbidity of solutions are obtained when the acid is added in at least moderate excess.

In place of the 95% alcohol referred to for admixture with the chloroform there may be used other alcohol, as, for example, methyl or isopropyl.

The chloroform may be substituted by other water insoluble organic liquid that is a solvent for urobilinogen, as, for instance, benzene or toluene. The solvent power for urobilinogen results in a desired separation of urobilinogen from the antipressor when water is added later. The decolorizing with charcoal may be omitted if a decolorized and finally practically white product is not desired. The use of the activated charcoal and like decolorizing agent is, however, strongly recommended.

Likewise various filtrations and clarifications may be omitted, but they are easy to effect and are desirable in improving the quality of the product.

The retention on the activated alumina may also be omitted and the transparent honey-colored material used directly as the antispasmodic. It is preferred, however, and very desirable to have the antispasmodic as free as possible from other foreign materials, even though these other materials are probably harmless in most instances of the use of the antispasmodic composition. The adsorption by the alumina followed by extration with ethyl acetate and the crystallizing are considered as more than justifying the slight extra expense of the purification.

In place of the ethyl acetate which is used as a solvent for recrystallizing the final product, there may be used other like solvents, as, for instance, methyl acetate, isopropyl acetate, or mixtures of these esters with each other or ethyl acetate.

The crystals obtained may be washed with ether-acetone mixture if any of them are colored appreciably when first obtained.

It will be understood that the original extraction of the urine with butyl ether removes from the urine not only those nonvolatile ingredients that are fats but also fat-soluble substances that go in the same phase with the fats in the extraction.

It will be understood also that it is intended to cover all changes and modifications of the example of the invention herein chosen for the purpose of illustration which do not constitute departures from the spirit and scope of the invention.

What I claim is:

1. The method of making an antispasmodic composition which comprises extracting fat from the urine of a liver-bearing animal by means of a solvent for the fat that is not soluble in the urine, evaporating the defatted urine at least nearly to dryness, dissolving the residue in an organic solvent mixture therefor, the solvent mixture containing a water soluble alcohol and a water insoluble organic liquid that is a solvent for urobilinogen, mixing water with the resulting solution, the result being two phases, one containing most of the water and alcohol and the other the said water insoluble liquid, separating the water and alcohol phase from the other without change of state, and then evaporating the water and alcohol phase and crystallizing therefrom a crystalline water soluble material of melting point about 123-4° C.

2. The method described in claim 1, the said water insoluble liquid being chloroform.

3. A composition of matter consisting of the product made as described in claim 1, the said product having antispasmodic properties, being soluble in alcohol and in water, slightly soluble in ethyl acetate, insoluble in chloroform, in ether, and in acetone, being optically active, and having a melting point of approximately 123° to 124° C.

HAROLD M. RABINOWITZ.

REFERENCES CITED

The following references are of record in the file of this patent:

UNITED STATES PATENTS

| Number | Name | Date |
| --- | --- | --- |
| 1,969,608 | Häussler | Aug. 7, 1934 |
| 2,202,029 | Sevag | May 28, 1940 |
| 2,327,375 | Schwenk et al. | Aug. 24, 1943 |
| 2,363,549 | Rabinowitz | Nov. 28, 1944 |
| 2,375,979 | Doisy et al. | May 15, 1945 |
| 2,392,878 | Rabinowitz | Jan. 15, 1946 |

FOREIGN PATENTS

| Number | Country | Date |
| --- | --- | --- |
| 382,047 | Great Britain | Oct. 20, 1932 |
| 400,520 | Great Britain | Oct. 26, 1933 |